United States Patent
Hiki

(10) Patent No.: US 9,903,552 B2
(45) Date of Patent: Feb. 27, 2018

(54) VEHICULAR LAMP

(71) Applicant: Stanley Electric Co., Ltd., Tokyo (JP)

(72) Inventor: Satoru Hiki, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 15/296,917

(22) Filed: Oct. 18, 2016

(65) Prior Publication Data

US 2017/0114975 A1 Apr. 27, 2017

(30) Foreign Application Priority Data

Oct. 21, 2015 (JP) ................................. 2015-207397

(51) Int. Cl.
| | | |
|---|---|---|
| *B60Q 1/04* | (2006.01) | |
| *F21S 8/10* | (2006.01) | |
| *G06K 9/00* | (2006.01) | |

(52) U.S. Cl.
CPC ............ *F21S 48/1225* (2013.01); *B60Q 1/04* (2013.01); *F21S 48/1208* (2013.01); *F21S 48/1388* (2013.01); *F21S 48/142* (2013.01); *G06K 9/00791* (2013.01)

(58) Field of Classification Search
CPC .. F21S 48/1225; F21S 48/1388; F21S 48/142; F21S 48/1208; B60Q 1/04
See application file for complete search history.

(56) References Cited

U.S. PATENT DOCUMENTS

| | | |
|---|---|---|
| 5,515,253 A | 5/1996 | Sjobom |
| 8,860,047 B2 | 10/2014 | Morimoto |
| 9,368,690 B2 | 6/2016 | Ito |
| 2009/0161360 A1 | 6/2009 | Li et al. |
| 2010/0149828 A1 | 6/2010 | Koizumi |
| 2015/0252975 A1 | 9/2015 | Nakada |

FOREIGN PATENT DOCUMENTS

| | | |
|---|---|---|
| EP | 2 306 077 A2 | 4/2011 |
| EP | 2 789 901 A2 | 10/2014 |
| JP | 2006-51850 A | 2/2006 |
| JP | 2014-53151 A | 3/2014 |
| KR | 10-2012-0126422 A | 11/2012 |
| WO | 2009/130655 A2 | 10/2009 |

OTHER PUBLICATIONS

The extended European search report for the related European Patent Application No. 16194607.4 dated Feb. 28, 2017.

*Primary Examiner* — Thomas M Sember
(74) *Attorney, Agent, or Firm* — Kenealy Vaidya LLP

(57) ABSTRACT

A vehicular lamp including a drive assistance for drivers of forward vehicles can include a plurality of light-emitting chips located on a mounting board and arranged in a matrix array shape, a first optical lens and a second optical lens. When the light-emitting chips emit lights, the lights can form linear light distribution patterns including linear non-lighting-emitting zones between the adjacent linear light distribution patterns. Each of light-emitting times of the linear light distribution patterns and each of light-emitting cycles of the linear light distribution patterns can vary in accordance with a distance between a subject vehicle incorporating the vehicular lamp and the front vehicle, which moves in a forward direction of the subject matter. Therefore, the vehicular lamp with a simple structure can facilitate a driving safely when the drivers turn the forward vehicle around by confirming the linear light distribution patterns with a door/room mirror and a monitor.

12 Claims, 14 Drawing Sheets

VEHICULAR LAMP

This application claims the priority benefit under 35 U.S.C. § 119 of Japanese Patent Application No. 2015-207397 filed on Oct. 21, 2015, which is hereby incorporated in its entirety by reference.

BACKGROUND

1. Field

The presently disclosed subject matter relates to vehicular lamps, and more particularly to vehicular lamps with a simple structure including a drive assistance for drivers of a forward vehicle, which moves in a frontward direction of a subject vehicle incorporating the vehicle lamp especially when the drivers turn the forward vehicle around, and thereby drivers of the subject vehicle may also be facilitated for a safe driving.

2. Description of the Related Art

When drivers turn a vehicle around while the drivers steer the vehicle, the vehicle is subject to a rear-end collision by a rearward vehicle, which approaches from a rearward direction of the vehicle, especially on a road with poor visibility at night. Hence, various drive assist apparatuses have been developed. For example, a conventional drive assist apparatus, which may facilitate drivers of a subject vehicle incorporating the drive assist apparatus when the drivers turn the subject vehicle around, is disclosed in Patent Document No. 1 (Japanese Patent Application Laid Open JP 2006-51850).

FIG. 14a is a schematic block diagram depicting the conventional drive assist apparatus, and FIG. 14b is a schematic explanatory top view for explaining operations of the conventional drive assist apparatus shown in FIG. 14a, which is disclosed in Patent Document No. 1. The conventional drive assist apparatus includes: a camera 80 photographing in a rearward direction of a subject vehicle incorporating the drive assist apparatus, and outputting image data in the rearward direction; and an image processing controller 81 receiving the image data from the camera 80, detecting a distance between the subject vehicle and a rearward vehicle, which moves from a rearward direction of the subject vehicle toward the subject vehicle, and outputting image control data including a guide line for a drive assist and warning voice data in accordance with the image data output from the camera 80, a turning signal output from a turning signal switch 86, a speed signal output from a speed sensor 87, and a rudder signal output from a rudder angle sensor 88.

In addition, the conventional drive assist apparatus also includes: a display controller 82 generating display data in accordance with the image control data output from the image processing controller 81; a monitor 83 displaying the display data; a voice output circuit 84 generating voice data in accordance with the warning voice data output from the image processing controller 81; and speaker 17 pronouncing the voice data for drivers of the subject vehicle. In this case, the above-described guide line for a drive assist includes: Region 91 located next to the subject vehicle 90; Region 92 being a dangerous zone when turning the subject vehicle 90 around; Region 93 being a warning zone when turning the subject vehicle 90 around; Region 94 being a safe zone even when turning the subject vehicle 90 around; and wherein the conventional drive assist apparatus facilitates the drivers of the subject vehicle 90 in accordance with the guide line when the drivers turn the subject vehicle 90 around by using the monitor 13 and the speaker 15.

However, the conventional drive assist apparatus need at least controllers such as the image processing controller and the display controller in addition to the camera, and therefore may be subject to a complex structure. Additionally, the drivers may not afford a watch with the monitor 13 because the drivers may generally confirm surrounding conditions with a door mirror when the drivers turn the subject vehicle around. Accordingly, drivers of a rear vehicle, which moves toward the subject vehicle, may not also drive responsibly at ease.

The above-referenced Patent Documents and additional Patent Documents are listed below and are hereby incorporated with their English abstracts and specification in their entireties.

1. Patent Document No. 1: Japanese Patent Application Laid Open JP 2006-51850
2. Patent Document No. 2: U.S. Pat. No. 8,860,047
3. Patent Document No. 3: U.S. Pat. No. 9,368,690

The disclosed subject matter has been devised to consider the above and other problems, characteristics and features. Thus, exemplary embodiments of the disclosed subject matter can include vehicular lamp with s simple structure including a drive assistance for drivers of a forward vehicle, which moves in a frontward direction of a subject vehicle incorporating the vehicle lamp especially when the drivers turn the forward vehicle around, and thereby drivers of the subject vehicle may also be facilitated for a safe driving.

SUMMARY

The presently disclosed subject matter has been devised in view of the above and other characteristics, desires, and problems in the conventional art. An aspect of the disclosed subject matter can include providing vehicular lamps with a simple structure, which can provide linear light distribution patterns including non-light-emitting linear zones between the adjacent linear light distribution patterns, in which each of light-emitting times of the linear light distribution patterns and each of light-emitting cycles of the linear light distribution patterns varies in accordance with a distance between a subject vehicle incorporating the vehicle lamp and a front vehicle, which moves in a forward direction of the subject matter. Therefore, the vehicular lamp can facilitate a driving safely when the drivers turn the forward vehicle around by confirming the linear distribution patterns with a door mirror, etc.

According to an aspect of the disclosed subject matter, a vehicular lamp can include: a mounting board formed in a substantially planar shape; a plurality of light-emitting chips located on a mounting surface of the mounting board and arranged in a matrix array shape, in which each of the light-emitting chips includes a plurality of light-emitting chips extending in substantially parallel with respect to each other and also aligns in a direction substantially perpendicular to an extending direction of the plurality of light-emitting chips; and a first optical lens mounted on the mounting surface of the mounting board using a first supporter of the first optical lens, which is formed in a tubular shape and connects to a first lens portion, the first optical lens covering the plurality of light-emitting chips, the first lens portion of the first optical lens including a first rod lens having a first rod incident surface and a first rod light-emitting surface, a second rod lens having a second rod incident surface and a second rod light-emitting surface, a third rod lens having a third rod incident surface and a third rod light-emitting surface and a fourth rod lens having a fourth rod incident surface and a fourth rod light-emitting surface, each of the first, second, third and fourth rod light-emitting surfaces located in an opposite direction of a respective one of the first, second, third and fourth rod incident surfaces and being located over a respective one of the plurality of light-emitting chips, respectively, and each of the first rod lens, the second rod lens, the third rod lens and the fourth rod lens extending along the respective one of the plurality of light-emitting chips, respectively, and connecting in turn.

In addition, the vehicular lamp can also include a second optical lens having a second lens portion and a second supporter mounted on the mounting surface of the mounting board using the second supporter, which is formed in a tubular shape and connects to the second lens portion, the second optical lens covering the first optical lens, and the second lens portion of the second optical lens having a second lens incident surface and a second lens light-emitting surface located in an opposite direction of the second lens incident surface, the second lens incident surface formed in a concave shape toward the second lens light-emitting surface and facing the first lens portion of the first optical lens, and the second light-emitting surface of the second optical lens formed in a convex shape in an opposite direction of the second incident surface, and wherein when the plurality of light-emitting chips emits lights, each of linear light distribution patterns formed by the lights is configured to extend in the extending direction of the plurality of light-emitting chips from the second lens light-emitting surface of the second optical lens and to gather in the aligning direction of the plurality of light-emitting chips from the second lens light-emitting surface of the second optical lens, respectively, and also is configured to include linear non-lighting-emitting zones between the adjacent linear light distribution patterns in the aligning direction of the plurality of light-emitting chips.

In the above-described vehicular lamp, the vehicular lamp can further include a casing, the mounting board mounted on a bottom surface of the casing, a part of the second optical lens, which projects from the second supporter of the second optical lens toward a top surface of the casing, located adjacent the top surface of the casing, and also the second supporter of the second optical lens located adjacent a side surface of the casing. The lights emitted from the plurality of light-emitting chips can be a substantially single color light, and also can be alternately two color lights.

According to the aspect of the disclosed subject matter, the exemplary vehicular lamps can provide linear light distribution patterns including non-light-emitting linear zones between the adjacent linear light distribution patterns, in which each of light-emitting times of the linear light distribution patterns and each of light-emitting cycles of the linear light distribution patterns varies in accordance with a distance between a subject vehicle incorporating the vehicle lamp and a front vehicle, which moves in a forward direction of the subject matter. Therefore, the disclosed subject matter can include providing vehicular lamps with a simple structure, which can facilitate a driving safely when the drivers turn the forward vehicle around by confirming the linear distribution patterns with a door mirror, etc.

According to an exemplary variation of the aspects of the disclosed subject matter, the variation of the vehicular lamp can replace the first optical lens of the vehicle lamp with a third optical lens. In this case, at least one light-emitting device can integrates the third optical lens with the light-emitting chip. Additionally, the variation can further include a first shade mounted on the mounting surface of the mounting board, and located between the adjacent light-emitting chips in the aligning direction of the plurality of light-emitting chips, wherein at least one of the third optical lenses is located between the adjacent first shades, and also can further include a second shade mounted on the mounting surface of the mounting board, and located between the adjacent light-emitting chips in the aligning direction of the plurality of light-emitting chips, wherein at least one of the third optical lenses is located between the adjacent second shades.

Accordingly, the vehicle lamp can provide various linear light distribution patterns such that a light distribution illuminates a position far away from the vehicle lamp with light having a high light-intensity, another light distribution illuminates another position near the vehicular lamp with a wide range, and other light distributions are interpolated between their light distributions in series with a simpler structure. Thus, the disclosed subject matter can provide vehicular lamps with a simple structure including a drive assistance for drivers of the forward vehicle, and thereby the drivers of the subject vehicle can also be facilitated for a safe driving.

BRIEF DESCRIPTION OF THE DRAWINGS

These and other characteristics and features of the disclosed subject matter will become clear from the following description with reference to the accompanying drawings, wherein:

FIG. 14b is a schematic explanatory top view for explaining operations of the conventional drive assist apparatus shown in FIG. 14a.

DETAILED DESCRIPTION OF EXEMPLARY EMBODIMENTS

Figure 1:
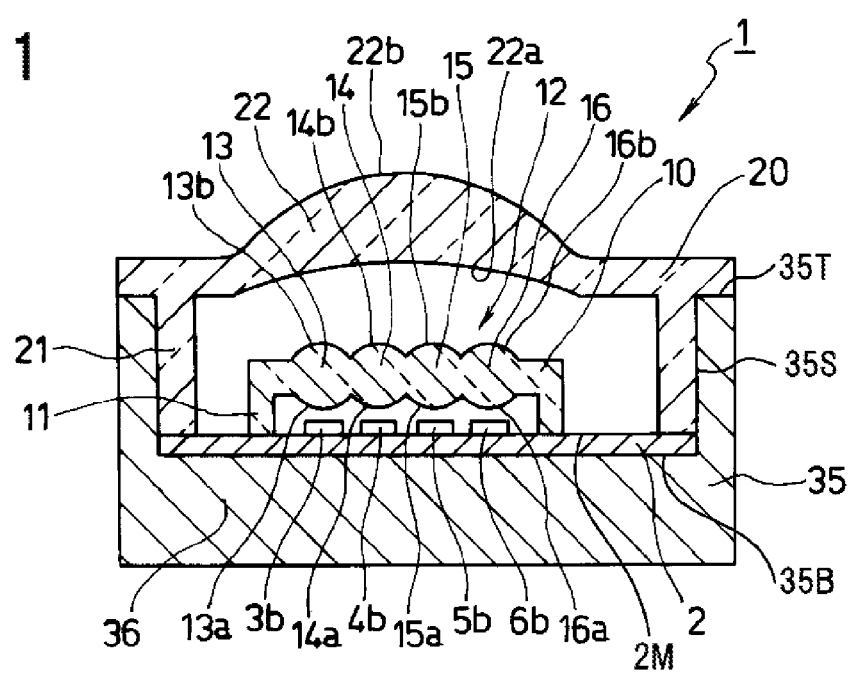
FIG. 1 is a cross-sectional view showing an exemplary embodiment of a vehicular lamp made in accordance with principles of the disclosed subject matter.

The disclosed subject matter will now be described in detail with reference to FIG. 1 to FIG. 13. FIG. 1 is a cross-sectional view showing an exemplary embodiment of a vehicular lamp made in accordance with principles of the disclosed subject matter. The vehicular lamp 1 can include: a casing 35 having a bottom surface 35B, a top surface 35T and a side surface 35S located between the top surface 35T and the bottom surface 35B made from a material having a high thermal conductivity such as a metallic plate, a ceramic material, etc.; a mounting board 2 having a mounting surface 2M located on the bottom surface 35B of the casing 35; and a plurality of light-emitting chips 3b, 4b, 5b and 6b located on the mounting surface 2M of the mounting board 2 as a matrix array, in which each of the light-emitting chips 3b, 4b, 5b and 6b includes a plurality of light-emitting chips extending in substantially parallel with respect to each other and also aligns in a direction substantially perpendicular to an extending direction of the plurality of light-emitting chips.

In addition, the vehicular lamp 1 can also include: a first optical lens 10 having a first supporter 11 formed in a tubular shape and a first lens portion 12 connecting the supporter 11, the first lens portion 12 including a first rod lens 13, a second rod lens 14, a third rod lens 15 and a fourth rod lend 16, each of the first rod lens 13, the second rod lens 14, the third rod lens 15 and the fourth rod lens 16 having a first, second, third and fourth rod incident surface 13a, 14a, 15a and 16a and a first, second, third and fourth rod light-emitting surface 13b, 14b, 15b and 16b located in an opposite direction of a respective one of the rod incident surfaces 13a, 14a, 15a and 16a, respectively, located over a respective one of the plurality of light-emitting chips 3b, 4b, 5b and 6b, extending along the respective one of the plurality of light-emitting chips 3b, 4b, 5b and 6b and connecting in turn, and the first optical lens 10 mounting on the mounting surface 2M of the mounting board 2 using the first supporter 11 thereof, which surrounds the plurality of light-emitting chips 3b, 4b, 5b and 6b.

Moreover, the vehicular lamp 1 can also include a second optical lens 20 having a second supporter 21 formed in a tubular shape and a second lens portion 22 connecting the second supporter 21, the second optical lens 20 mounting on the mounting surface 2M of the mounting board 2 using the second supporter 21 thereof, which surrounds the first optical lens 10, and the second lens portion 22 having a second lens incident surface 22a and a second lens light-emitting surface 22b located in an opposite direction of the second lens incident surface 22a, the second lens incident surface 22a formed in a concave shape toward the second lens light-emitting surface 22b and facing the first lens portion 12 of the first optical lens 10, and the second lens light-emitting surface 22b formed in a convex shape in an opposite direction of the second lens incident surface 22a. In this case, a part of the second optical lens 20, which projects from the second supporter 21 toward the top surface 35T of the casing 35, can located adjacent the top surface 35T of the casing 35 as shown in FIG. 1.

As at least one of each of the plurality of light-emitting chips 3b, 4b, 5b and 6b described above, a semiconductor light-emitting device, which is disclosed in Patent Documents No. 2 and No. 3 owned by Applicant of this disclosed subject matter, can be used. Although the light-emitting device may emit various color lights, when the light-emitting device is used as the at least one of the plurality of light-emitting chips 3b, 4b, 5b and 6b, a single color light including substantially white light can be employed. Details of the light-emitting device will be abbreviated because the details are disclosed in Patent Documents No. 2 and No. 3.

Figure 2:
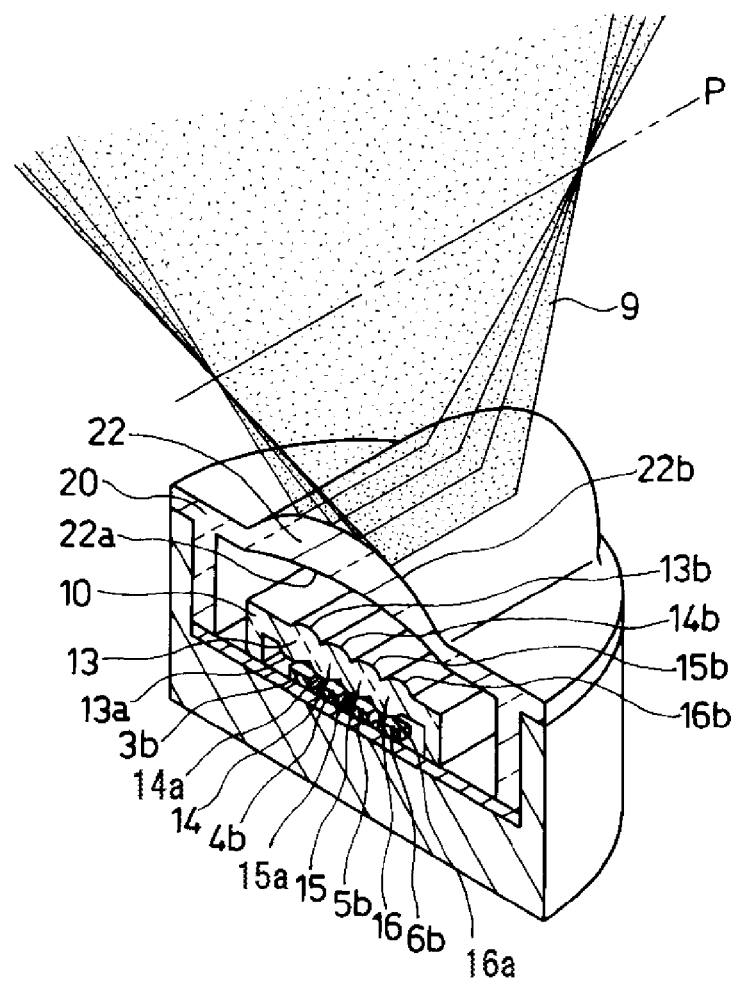
FIG. 2 is a perspective view depicting an exemplary light-emitting direction of the vehicular lamp shown in FIG. 1.
Figure 3:
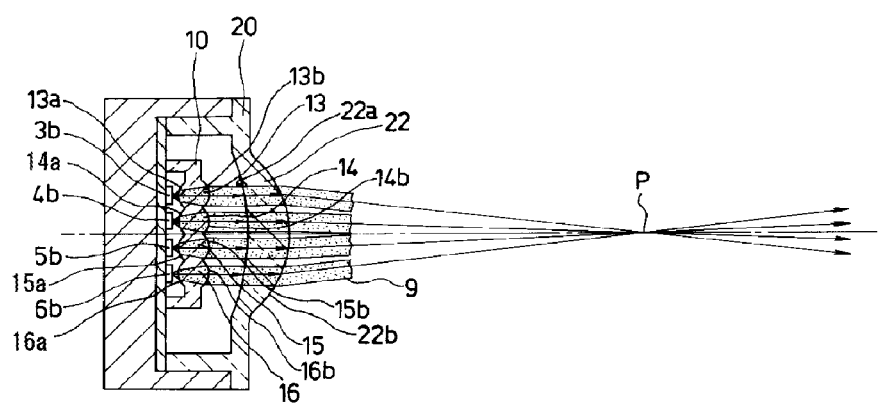
FIG. 3 is a cross-sectional view depicting the exemplary light-emitting direction of the vehicular lamp shown in FIG. 1.

FIG. 2 is a perspective view depicting an exemplary light-emitting direction of the vehicular lamp shown in FIG. 1, and FIG. 3 is a cross-sectional view depicting the exemplary light-emitting direction of the vehicular lamp shown in FIG. 1. Each of lights emitted from the light-emitting chips 3b, 4b, 5b and 6b can enter into the first rod lens 13, the second rod lens 14, the third rod lens 15 and the fourth rod lens 16 from the respective one of the rod incident surfaces 13a, 14a, 15a and 16a, respectively, and can be emitted from the respective one of the rod light-emitting surfaces 13b, 14b, 15b and 16b, which is located in the opposite direction of the respective one of the rod incident surfaces 13a, 14a, 15a and 16a, toward the second optical lens 20, respectively.

In these cases, light emitted from the respective one of the rod light-emitting surfaces 13b, 14b, 15b and 16b of the first optical lens 10 can form an extended light distribution pattern from the respective one of the rod light-emitting surfaces 13b, 14b, 15b and 16b in the extending direction of each of the first rod lens 13, the second rod lens 14, the third rod lens 15 and the fourth rod lens 16, which includes the respective one of the rod light-emitting surfaces 13b, 14b, 15b and 16b, respectively. The extended light distribution pattern can be formed in a condensing shape in an aligning direction of each of the first rod lens 13, the second rod lens 14, the third rod lens 15 and the fourth rod lens 16.

Accordingly, the vehicular lamp 1 can emit each of lights, which extend in the extending direction of each of the rod lenses 13, 14, 15 and 16 and gather in the aligning direction of each of the rod lenses 13, 14, 15 and 16 from the respective one of the rod light-emitting surfaces 13b, 14b, 15b and 16b of the first optical lens 10 toward the second optical lens 20, respectively. Such light emitted from the respective one of the rod light-emitting surfaces 13b, 14b, 15b and 16b of the first optical lens 10 can enter into the second optical lens 20 from the second lens incident surface 22a of the second optical lens 20, and can be emitted from second lens light-emitting surface 22b of the second optical lens 20.

Therefore, the vehicular lamp 1 can emit each of lights, which maintain the above-described light distribution patterns such that extends in the extending direction of each of the rod lenses 13, 14, 15 and 16 and gathers at a substantially linear focus P in the aligning direction of each of the rod lenses 13, 14, 15 and 16 from the second lens incident surface 22a of the second optical lens 20 as linear light distribution patterns 9 using a lens effect, in which the second lens incident surface 22a is formed in the concave shape toward the second lens light-emitting surface 22b and faces the first lens portion 12 of the first optical lens 10, and the second lens light-emitting surface 22b is formed in the convex shape in an opposite direction of the second lens incident surface 22a, as shown in FIG. 2 and FIG. 3.

Figure 4:
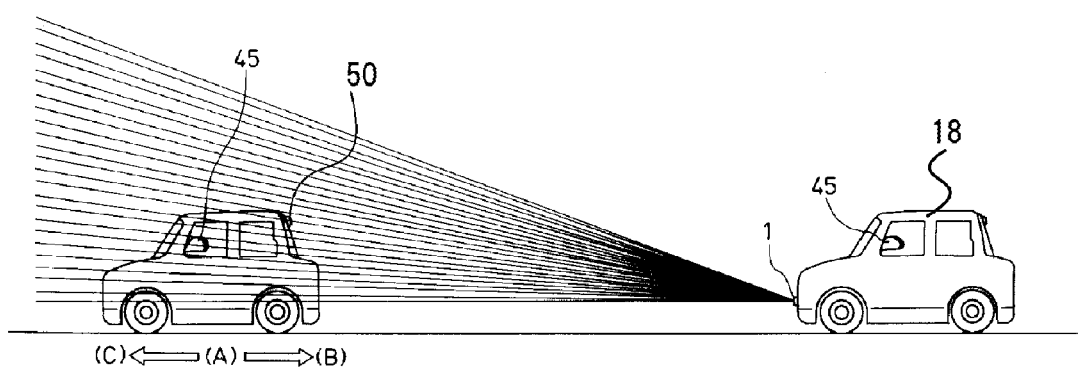
FIG. 4 is an explanatory side view showing an exemplary attaching location of the vehicular lamp shown in FIG. 2 and a relation between the vehicular lamp and a forward vehicle, which moves in a forward direction of the vehicular lamp.

When the vehicular lamp 1 is incorporated into a subject vehicle 18, the vehicular lamp 1 can be incorporated in a headlight so that the substantially linear focus P thereof is located in a substantially parallel direction with a road, on where the subject vehicle 18 drives, and also can be attached to a front of the subject vehicle 18 so that the substantially linear focus P thereof is located in a forward direction of the subject vehicle 18 as shown in FIG. 4. In these cases, drivers for a forward vehicle, which drives in a frontward direction of the subject vehicle 18, can confirm the linear light distribution patterns 9 with a door mirror 45, a monitor via a camera 50, which photographs in a backward direction of the forward vehicle to be convenient to park the vehicle, etc.

Figure 5A:
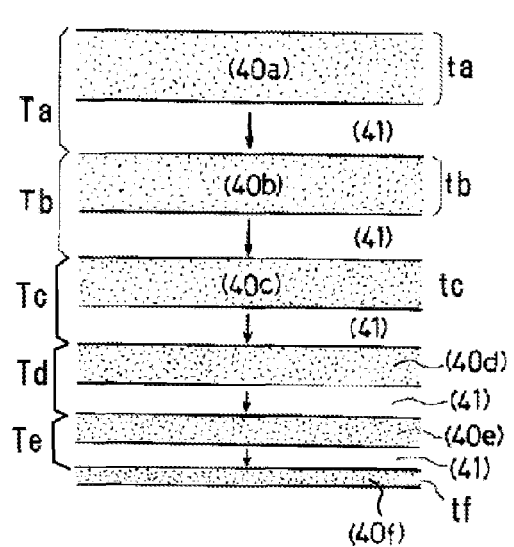
FIGS. 5a and 5b are explanatory schematic diagrams showing each of exemplary light distribution patterns received by the forward vehicle, when a door mirror of the forward vehicle is at position (B) and when the door mirror of the forward vehicle is at position (C) as shown in FIG. 4, respectively.

Next, exemplary confirming methods for the drivers of the forward vehicle will now be described with reference to FIG. 5a to FIG. 6, in which the number of the linear light distribution patterns 9 increases to facilitate understandings thereof as compared with the vehicular lamp 1 shown in FIG. 3. The drivers of the forward vehicle may confirm the linear light distribution patterns 9 (40a) to (40f) with confidence because there are non-light-emitting linear zones (41) between the adjacent linear light distribution patterns. In this case, when the subject vehicle 18 approaches toward the front vehicle from position (A) to position (B) as shown in FIG. 4, each of light-emitting times ta to tf of the linear light distribution patterns (40a) to (40f) and each of light-emitting cycles Ta to Te of the linear light distribution patterns (40a) to (40f) can become shorter as shown FIG. 5a.

Figure 5B:
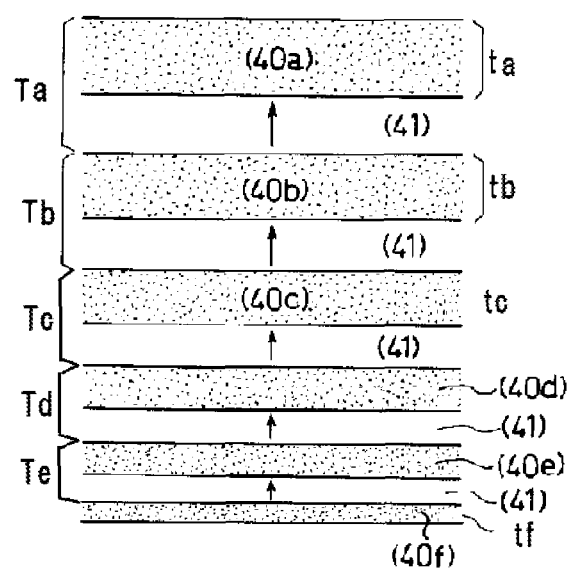
Figure 6:
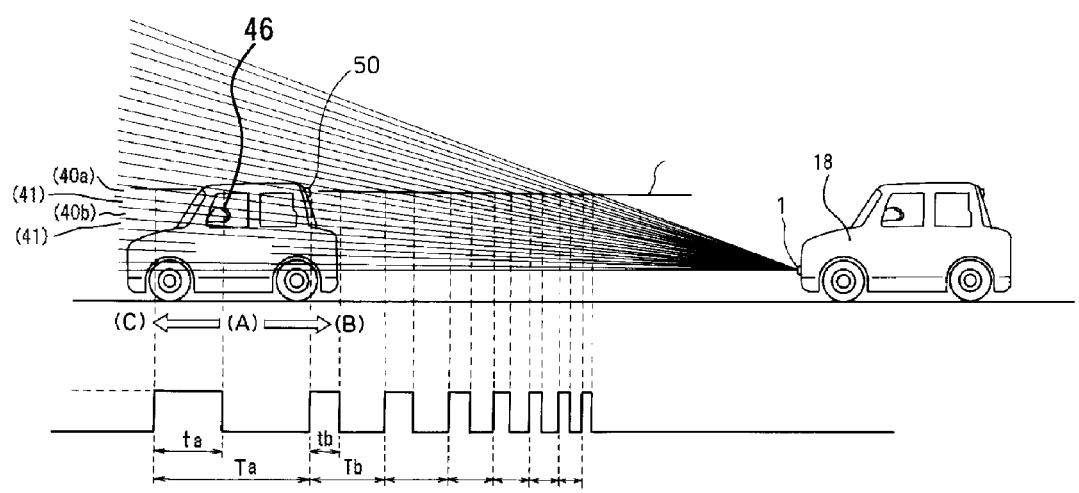
FIG. 6 is an explanatory schematic side view showing a timing chart corresponding to the exemplary light distribution pattern when the door mirror of the forward vehicle varies from position (A) to position (C) shown in FIG. 4.
Figure 7:
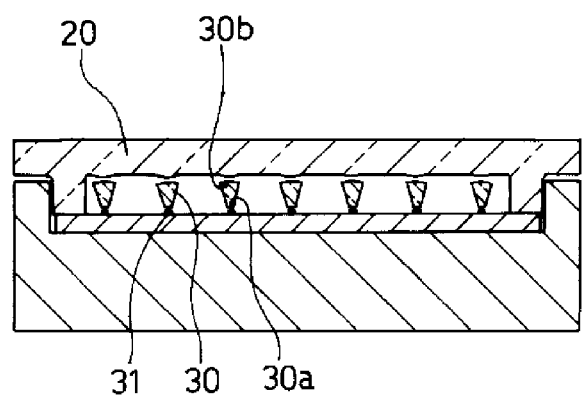
FIG. 7 is a cross-sectional view showing an exemplary first variation of the vehicular lamp shown in FIG. 1.

When a distance between the subject vehicle 18 and the front vehicle becomes longer from position (A) to position (C) as shown in FIG. 4, each of the light-emitting times ta to tf of the linear light distribution patterns (40a) to (40f) and each of the light-emitting cycles Ta to Te of the linear light distribution patterns (40a) to (40f) can become longer as shown FIG. 5b. More specifically, each of the light-emitting times ta to tf of the linear light distribution patterns (40a) to (40f) and each of the light-emitting cycles Ta to Te of the linear light distribution patterns (40a) to (40f) can operate as a timing chart, as shown in FIG. 6. When a vehicle height of the forward vehicle is higher, a respective one of linear light distribution patterns, which are continuously located in an upward direction, can be used as each of the linear light distribution patterns (40a) to (40f).

Accordingly, the drivers of the forward vehicle can judge that the distance between the subject vehicle incorporating the vehicular lamp 1 and the forward vehicle becomes longer when each of the light-emitting times ta to tf of the linear light distribution patterns (40a) to (40f) and/or each of the light-emitting cycles Ta to Te of the linear light distribution patterns (40a) to (40f) becomes longer as shown FIG. 5b. The drivers of the forward vehicle can judge that the distance between the subject vehicle incorporating the vehicular lamp 1 and the forward vehicle becomes shorter when each of the light-emitting times ta to tf of the linear light distribution patterns (40a) to (40f) and/or each of the light-emitting cycles Ta to Te of the linear light distribution patterns (40a) to (40f) becomes shorter as shown FIG. 5a.

In addition, when each of the light-emitting times ta to tf of the linear light distribution patterns (40a) to (40f) and/or each of the light-emitting cycles Ta to Te of the linear light distribution patterns (40a) to (40f) rarely varies, the drivers of the forward vehicle can judge that the distance between the subject vehicle incorporating the vehicular lamp 1 and the forward vehicle maintains at an almost same distance. Accordingly, the vehicular lamp 1 can facilitate a driving safely when the drivers turn the forward vehicle around. The vehicle lamp 1 does not need at least controllers such as the image processing controller and the display controller unlike the conventional drive assist apparatus described above, and therefore can be formed with a simple structure.

Moreover, the drivers of the forward vehicle need not to watch with the monitor but to only confirm the linear light distribution patterns along with surrounding conditions using the door mirror 46 when the drivers turn the forward vehicle around. Therefore, the drivers of the subject vehicle 18 incorporating the vehicular lamp 1, which is formed with the simple structure, can also be facilitated for a safe driving. The linear light distribution patterns (40a) to (40f) can alternately use two color lights so as to be able to be easily confirmed by the drivers, for example, linear light distribution patterns (40a), (40c) and (40e) color substantially white light and linear light distribution patterns (40b), (40d) and (40f) color substantially red light.

However, when the forward vehicle includes a monitor for photograph in the forward direction of the vehicle via a camera to facilitate parking the vehicle, the vehicle lamp 1 may also project the linear light distribution patterns with the monitor via the camera in advance of turning the forward vehicle around by associating the linear light distribution patterns projected from the vehicle lamp 1 with an announce of a navigator, turn signal switch. For example, when the navigator announces "turn left at a next corner", the linear light distribution patterns 9 can be projected by the monitor for the navigator.

Next, exemplary variations of the vehicle lamp 1 will now be described. Differences between an exemplary first variation shown in FIG. 7 and the vehicle lamp 1 shown in FIG. 1 relates to a replacement the first optical lens 10 of the vehicle lamp 1 with a third optical lens 30 in the first variation. The third optical lens 30 having a third lens incident surface 30a and a third lens light-emitting surface 30b can located on/over a light-emitting chip 31, which is located in a matrix shape in common with the vehicle lamp 1. A shape of the second optical lens 20 can also vary in association with the third optical lens 30 shown in FIG. 7, which shows a cross-sectional view from the aligning direction of the linear light distribution patterns 9.

Figure 8A:
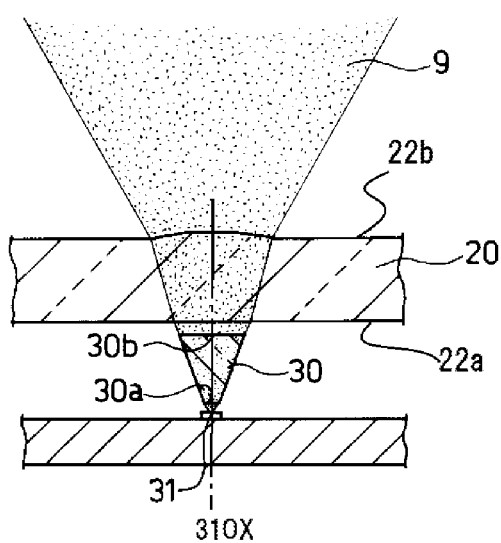
FIGS. 8a and 8b are cross-sectional views depicting exemplary light distributions in an extending direction and in an aligning direction of linear light distribution patterns formed by the vehicular lamp shown in FIG. 7, respectively.

More specifically, as shown in FIG. 8a, which shows a cross-sectional view from the extending direction of the linear light distribution patterns 9, each of the third lens incident surface 30a and the third lens light-emitting surface 30b of the third optical lens 30 can be located in a direction substantially perpendicular to an optical axis 31OX of the light-emitting chip 31, and can be formed in a substantially planar shape. The second lens incident surface 22a of the second optical lens 20 can also be formed in a substantially planer shape, and the second lens light-emitting surface 22b of the second optical lens 20 can be formed in a convex shape in an opposite direction of the third lens light-emitting surface 30b of the third optical lens 30. Thereby, each of lights emitted from the light-emitting chips 31 located in a matrix shape can be formed in continuously linear light distribution patterns in the extending direction of the linear light distribution patterns 9 in common with the vehicular lamp 1.

Figure 8B:
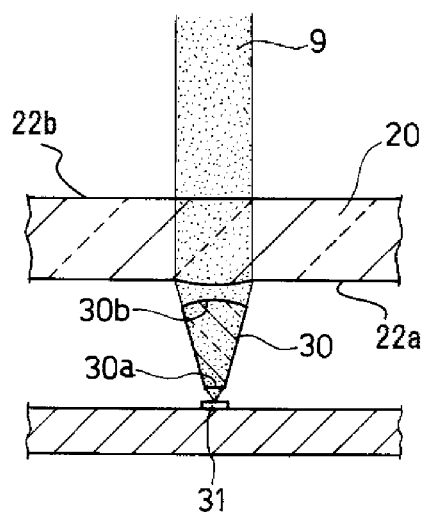

In the meanwhile, as shown in FIG. 8b, which shows a cross-sectional view from the aligning direction of the linear light distribution patterns 9, although the third lens incident surface 30a of the third lens 30 can be located in a direction substantially perpendicular to the optical axis 31OX of the light-emitting device and can be formed in a substantially planar shape, the third lens light-emitting surface 30b of the third optical lens 30 can be formed in a convex shape toward the second optical lens 20. The second lens incident surface 22a of the second optical lens 20 can also be formed in a convex shape toward the third optical lens 30, and the convex shape of the second lens incident surface 22b of the second lens 20 can face that of the third lens light-emitting surface 30b of the third optical lens 30. Thereby, each of lights emitted from the light-emitting chips 31 located in a matrix shape can be formed in substantially parallel light distribution patterns in the aligning direction of the linear light distribution patterns 9 in common with the vehicular lamp 1.

When the light-emitting device, for example, disclosed in Patent Document No. 2, is used as the light-emitting chip 31 in the first variation of the vehicular lamp 1, the light-emitting device can integrate the third optical lens 30 with the light-emitting chip 31. Accordingly, because a mounting process of the third optical lens 30 may be abbreviated by mounting the light-emitting device 31 on the mounting surface 2M of the mounting board 2 shown in FIG. 1, the first variation of the vehicular lamp 1 can be formed in a simpler structure.

Figure 9:
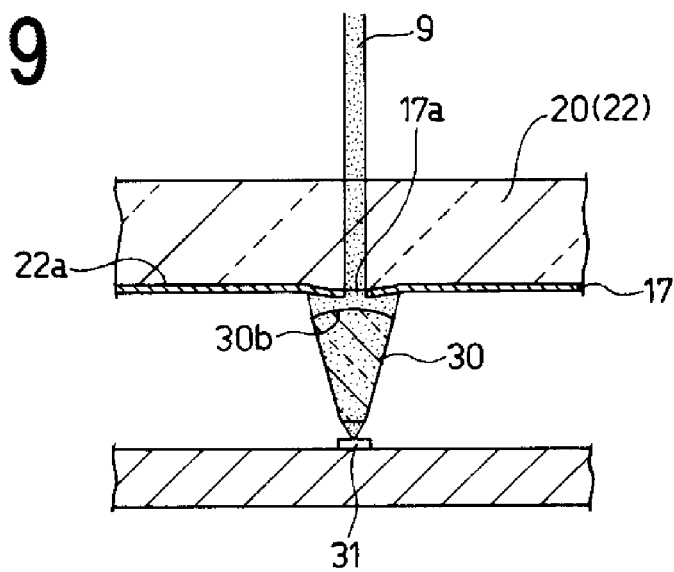
FIG. 9 is a cross-sectional view depicting a variation of the exemplary light distributions in the aligning direction of the linear light distribution patterns formed by the vehicular lamp shown in FIG. 7.

In the first variation described above, when each width of lights emitted from the light-emitting chips 31 located in a matrix shape, which are formed in substantially parallel light distribution patterns in the aligning direction of the linear light distribution patterns, varies, the second lens portion 22 of the second lens 20 can be provided with a shading mask 17 underneath the incident surface 22a thereof and a slit 17a, which passes through the second lens portion 22 as shown in FIG. 9. Thereby, each width of the lights emitted from the light-emitting chip 31 located in the matrix shape, which are formed in substantially parallel light distribution patterns in the aligning direction of the linear light distribution patterns, can properly vary.

Figure 10A:
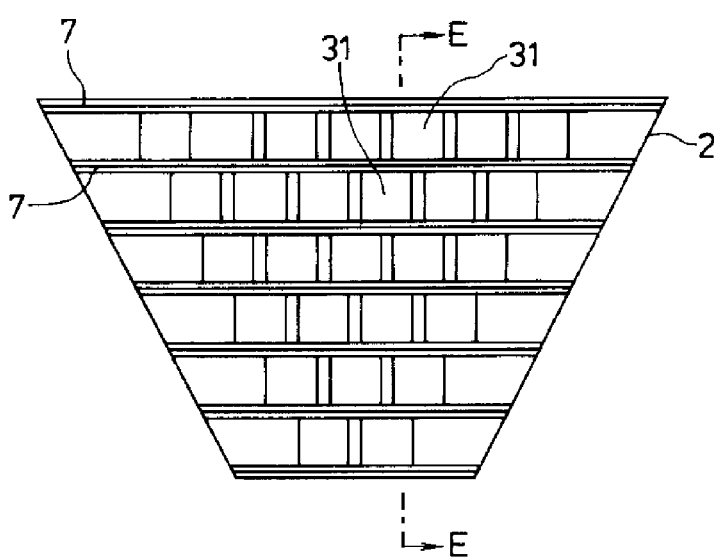
FIG. 10a is a partial top view showing a plurality of light-emitting chips of an exemplary second variation of the vehicular lamp of FIG. 1.
Figure 10B:
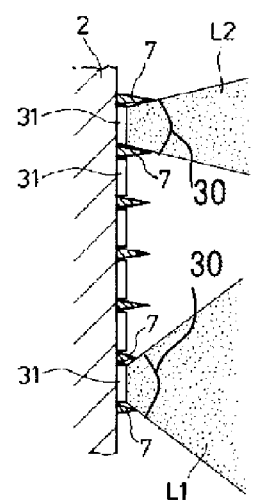
FIG. 10b is a cross-sectional view taken along Line E-E shown in FIG. 10a showing a part of light distributions of the plurality of light-emitting chips in the aligning direction of the linear light distribution patterns.

FIG. 10a is a partial top view showing the light-emitting chips 31 of an exemplary second variation of the vehicular lamp 1, and FIG. 10b is a cross-sectional view taken along Line E-E shown in FIG. 10a showing a part of light distributions of the plurality of light-emitting chips in the aligning direction of the linear light distribution patterns. When each width of lights emitted from the light-emitting chips 31 located in a matrix shape, which are located in the aligning direction of the linear light distribution patterns, expands, the mounting board 2 can be provided with a first shade 7 on the mounting surface 2M thereof so that the first shade 7 is located between the adjacent light-emitting chips 31 in the aligning direction of the plurality of light-emitting chips 31. Each of the third optical lens 30 can be disposed adjacent a respective one of the light-emitting chips 31.

Figure 11A:
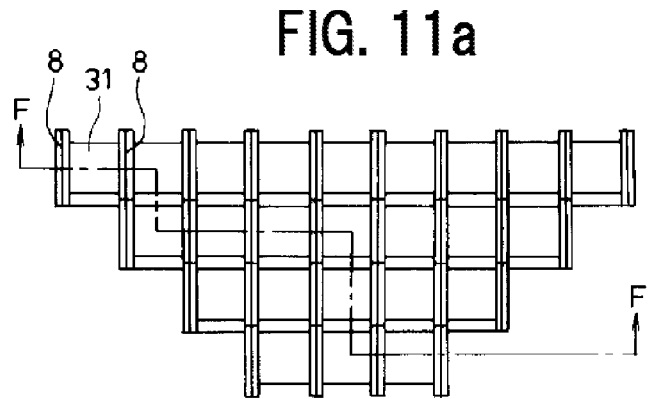
FIG. 11a is the partial top view showing the plurality of light-emitting chips of the exemplary second variation of the vehicular lamp of FIG. 1.
Figure 11B:
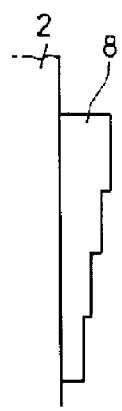
FIG. 11b is a side view showing second shades located between the adjacent light-emitting chips.
Figure 11C:
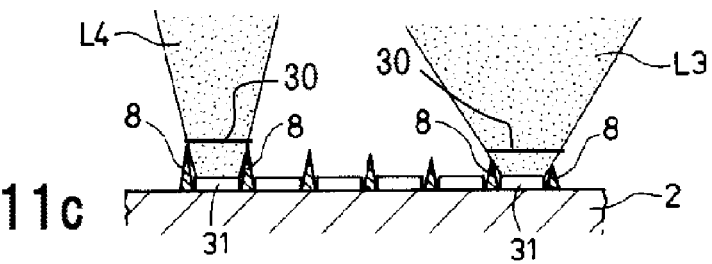
FIG. 11c is a cross-sectional view taken along Line F-F shown in FIG. 11a showing a par of light distributions of the plurality of light-emitting chips in the extending direction of the linear light distribution patterns.

Thereby, each width of lights emitted from the light-emitting chips 31 located in the matrix shape can slightly expands as Light L2 in accordance with an expanded angle and a height of the first shade 7, and also can largely expands as Light L1. Similarly, each depths of lights emitted from the light-emitting chips 31 located in the matrix shape, which are located in the extending direction of the linear light distribution patterns, can vary as Lights L3 and L4 in accordance with each expanded angle and each height of second shades 8, which are located between the adjacent light-emitting chips 31 in the extending direction of the plurality of light-emitting chips 31 as shown in FIG. 11a to FIG. 11b.

Figure 12:
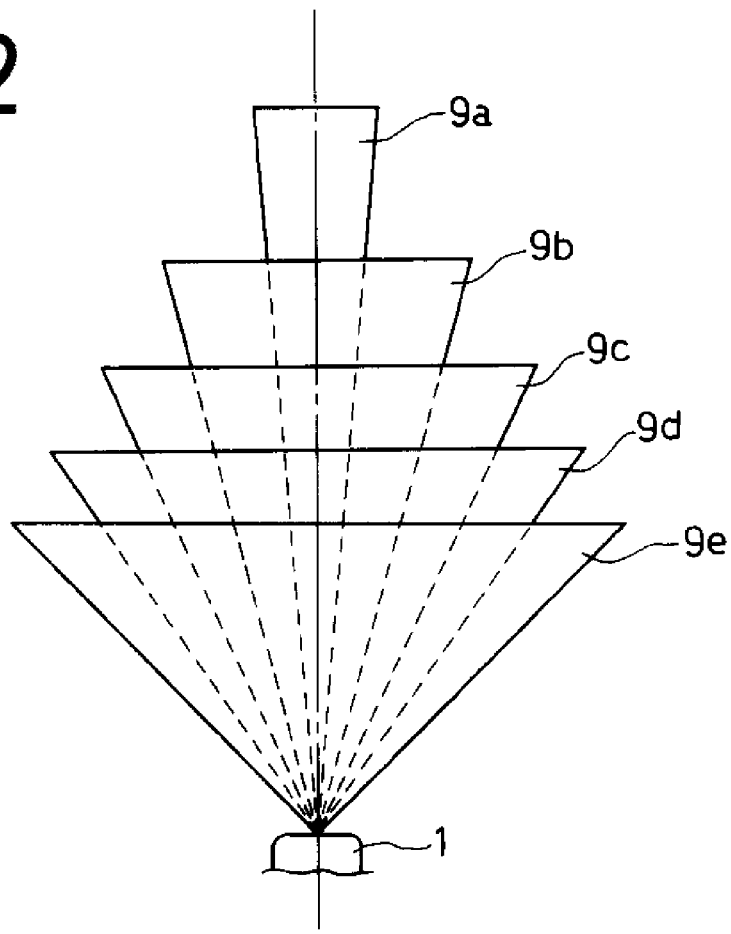
FIG. 12 is a side view depicting exemplary linear light distribution patterns of the second variation of the vehicular lamp shown in FIG. 1.
Figure 13:
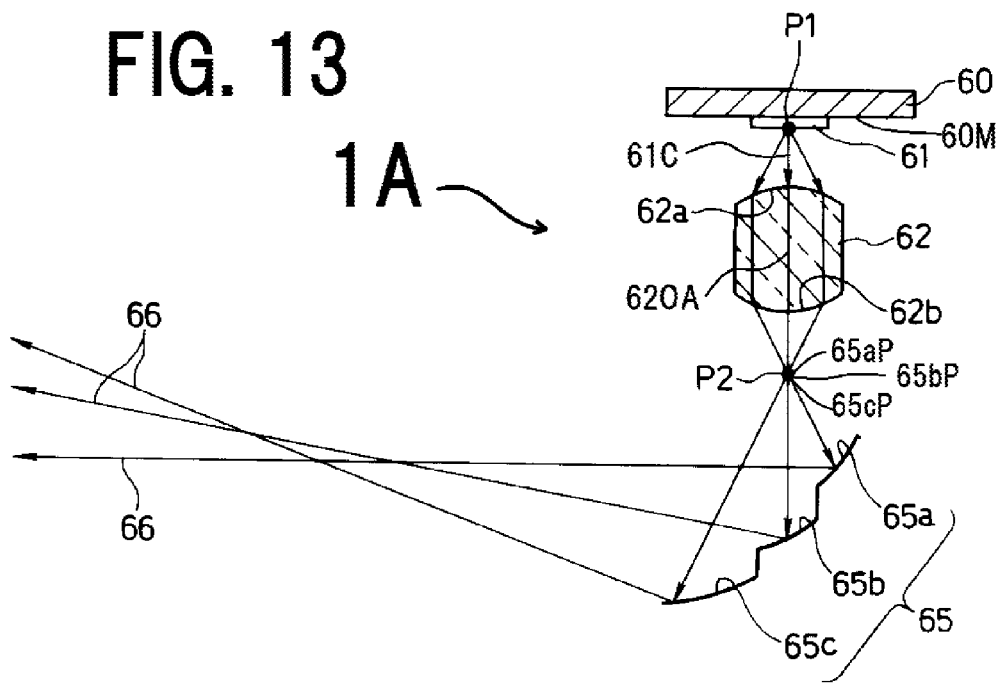
FIG. 13 is a schematic explanatory side view depicting an exemplary variation when the vehicular lamp shown in FIG. 1 is incorporated into a subject vehicle.
Figure 14A:
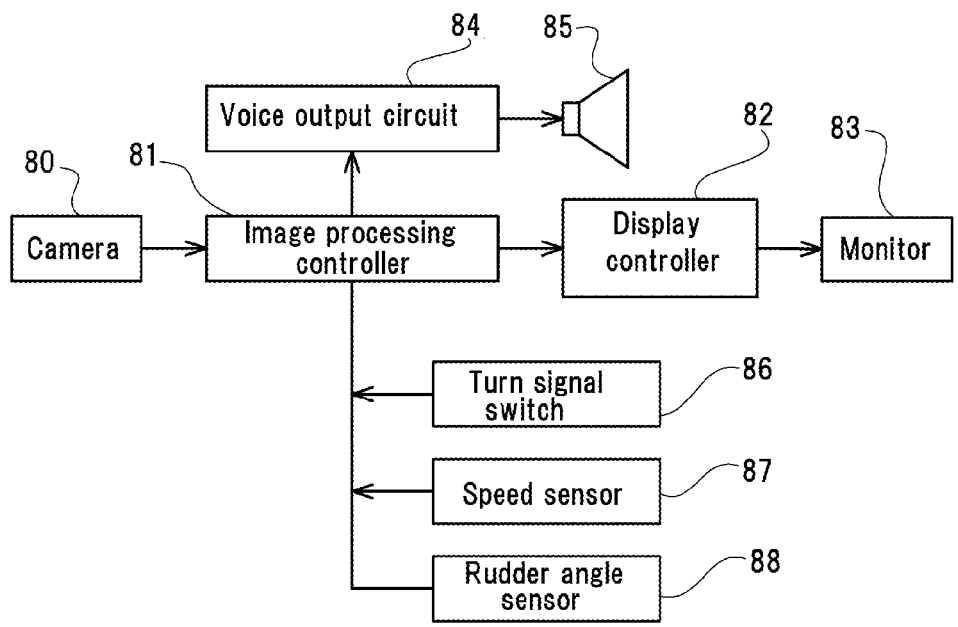
FIG. 14a is a schematic block diagram depicting a conventional drive assist apparatus.
Figure 14B:
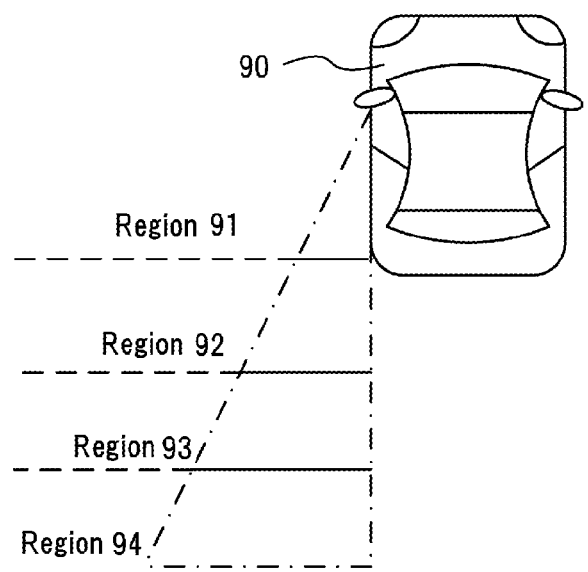

Accordingly, as shown in FIG. 12, which is a side view depicting exemplary linear light distribution patterns of the second variation, the second variation of the vehicular lamp 1 can form linear light distribution patterns, in which a light distribution 9a can illuminate a position far away from the vehicle lamp 1 with light having a high light-intensity, a light distribution 9e can illuminate another position near the vehicular lamp 1 with a wide range, and light distributions 9b, 9c and 9d can be interpolated between the light distributions 9a and 9e in series.

Embodiments of the vehicular lamp 1 described above are described when the vehicular lamp 1 is incorporated into the subject vehicle 18 so that the linear light distribution pattern 9 is directed toward the forward vehicle. Cases where the vehicular lamp 1 are incorporated in upward/downward directions of the subject vehicular 18 will now be described with reference to FIG. 13. A vehicular lamp 1A can include: a mounting board 60 having a mounting surface 60M: a plurality of light-emitting chips 61 having a central axis 61C aligned and mounted on the mounting surface 60M of the mounting board 60; a focusing lens 62 having a lens incident surface 62a, a lens light-emitting surface 62b, a first focus P1 located toward the lens incident surface 62a, a second focus P2 located toward the lens light-emitting surface 62b, and a lens optical axis 620A located so that the lens optical axis 620A substantially corresponds to the central axis 61C of the light-emitting chips 61.

In addition, the vehicular lamp 1A can also include a plurality of parabolic reflectors 65 including a first parabolic reflector 65a having a first reflector focus 65aP, a second parabolic reflector 65b having a second reflector focus 65bP, and including a third parabolic reflector 65c having a third reflector focus 65cP, and each of the first reflector focus 65aP, the second reflector focus 65bP and the third reflector focus 65c located at substantially the second focus P2 of the focusing lens 62b. In this case, lights emitted from the light-emitting chips 61 may converge at the first focus P1 of the focus lens 62, and also may converge at the second focus P2 of the focus lens 62 via the focus lens 62.

Each of the first reflector focus 65aP of the first parabolic reflector 65a, the second reflector focus 65bP of the second parabolic reflector 65b and the third reflector focus 65c of the third parabolic reflector 65c is located at substantially the second focus P2 of the focusing lens 62b. Therefore, the lights gathered at the second focus P2 of the focus lens 62 can be emitted from each of the first parabolic reflector 6a, the second parabolic reflector 6b and the third parabolic reflector 6c as linear light distribution pattern 66 in a radial fashion. The above-described vehicular lamp 1 can incorporated into a space of a headlight, and therefore can increase a design including a location possibility while sharing a housing and a lamp room with other lamps for headlight, etc.

According to the exemplary vehicular lamp, the exemplary vehicular lamp can provide the linear light distribution patterns 9 (40a) to (40f) including non-light-emitting linear zones (41) between the adjacent linear light distribution patterns, in which each of light-emitting times ta to tf of the linear light distribution patterns (40a) to (40f) and each of light-emitting cycles Ta to Te of the linear light distribution patterns (40a) to (40f) can become shorter when the subject vehicle 18 approaches toward the front vehicle. When the distance between the subject vehicle 18 and the front vehicle becomes longer, each of light-emitting times ta to tf of the linear light distribution patterns (40*a*) to (40*f*) and each of light-emitting cycles Ta to Te of the linear light distribution patterns (40*a*) to (40*f*) can become longer. Therefore, the vehicular lamp 1 can facilitate a driving safely when the drivers turn the forward vehicle around by confirming the linear distribution patterns with a door mirror.

In addition, when the forward vehicle includes a monitor for photograph in the forward direction of the vehicle via a camera to facilitate parking the vehicle, the vehicle lamp 1 may also project the linear light distribution patterns with the monitor via the camera in advance of turning the forward vehicle around by associating the linear light distribution patterns projected from the vehicle lamp 1 with the announce of the navigator. Thereby, drivers of the subject vehicle incorporating the vehicular lamp 1 may also be facilitated for a safe driving Moreover, the vehicle lamp 1 does not need at least controllers such as the image processing controller and the display controller unlike the conventional drive assist apparatus described above, and therefore can be formed with a simple structure. Furthermore, the vehicle lamp 1 can be easily incorporated into the subject vehicle, for example, can be incorporated into a headlight of the subject matter while associating with the other lamps for the headlight. Thus, the vehicular lamp 1 can increase a design possibility while sharing the housing and the lamp room with the other lamps for the headlight, etc.

Various modifications of the above disclosed embodiments can be made without departing from the spirit and scope of the presently disclosed subject matter. For example, cases where the vehicular lamp emits the linear light distribution pattern in a substantially parallel with a road is described. However, the vehicular lamp is not limited to this structure and can be freely incorporated into the subject vehicular. In addition, cases where the vehicular lamp includes the plurality of light-emitting chips arranged in matrix array shape having four rows, is described as a matter of convenience. However, the plurality of light-emitting chips is not limited to this location and can be arranged in matrix array shape having various rows and columns, and also can be arranged in a staggered array shape, etc.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A vehicular lamp, comprising:
   a mounting board having a mounting surface formed in a substantially planar shape;
   a plurality of light-emitting chips located on the mounting surface of the mounting board and arranged in a matrix array shape, in which each of the light-emitting chips includes a plurality of light-emitting chips extending in substantially parallel with respect to each other and also aligns in a direction substantially perpendicular to an extending direction of the plurality of light-emitting chips;
   a first optical lens having a first lens portion and a first supporter mounted on the mounting surface of the mounting board using the first supporter of the first optical lens, which is formed in a tubular shape and connects to the first lens portion, and the first optical lens covering the plurality of light-emitting chips, the first lens portion of the first optical lens including a first rod lens having a first rod incident surface and a first rod light-emitting surface, a second rod lens having a second rod incident surface and a second rod light-emitting surface, a third rod lens having a third rod incident surface and a third rod light-emitting surface and a fourth rod lens having a fourth rod incident surface and a fourth rod light-emitting surface, each of the first, second, third and fourth rod light-emitting surfaces located in an opposite direction of a respective one of the first, second, third and fourth rod incident surfaces and being located over a respective one of the plurality of light-emitting chips, respectively, and each of the first rod lens, the second rod lens, the third rod lens and the fourth rod lens extending along the respective one of the plurality of light-emitting chips, respectively, and connecting in turn;
   a second optical lens having a second lens portion and a second supporter mounted on the mounting surface of the mounting board using the second supporter of the second optical lens, which is formed in a tubular shape and connects to the second lens portion, and the second optical lens covering the first optical lens, and the second lens portion of the second optical lens having a second lens incident surface and a second lens light-emitting surface located in an opposite direction of the second lens incident surface, the second lens incident surface formed in a concave shape toward the second lens light-emitting surface and facing the first lens portion of the first optical lens, and the second light-emitting surface of the second optical lens formed in a convex shape in an opposite direction of the second incident surface; and
   wherein when the plurality of light-emitting chips emits lights, each of linear light distribution patterns formed by the lights is configured to extend in the extending direction of the plurality of light-emitting chips from the second lens light-emitting surface of the second optical lens and to gather in the aligning direction of the plurality of light-emitting chips from the second lens light-emitting surface of the second optical lens, respectively, and also is configured to include linear non-lighting-emitting zones between the adjacent linear light distribution patterns in the aligning direction of the plurality of light-emitting chips.

2. The vehicular lamp according to claim 1, further comprising:
   a casing having a bottom surface, a top surface and a side surface located between the top surface and the bottom surface, the mounting board mounted on the bottom surface of the casing, a part of the second optical lens, which projects from the second supporter of the second optical lens toward the top surface of the casing, located adjacent the top surface of the casing, and also the second supporter of the second optical lens located adjacent the side surface of the casing.

3. The vehicular lamp according to claim 1, wherein the lights emitted from the plurality of light-emitting chips are a substantially single color light.

4. The vehicular lamp according to claim 1, wherein the lights emitted from the plurality of light-emitting chips are alternately two color lights.

5. A vehicular lamp, comprising:
   a mounting board having a mounting surface formed in a substantially planar shape;
   a plurality of light-emitting chips each having an optical axis located on the mounting surface of the mounting board and arranged in a matrix array shape, in which each of the light-emitting chips includes a plurality of light-emitting chips extending in substantially parallel with respect to each other and also aligns in a direction substantially perpendicular to an extending direction of the plurality of light-emitting chips;

a plurality of third optical lens each having a third light-emitting surface and a third incident surface formed in a substantially planar shape, each of the third optical lens being located on a respective one of the light-emitting chips and each of the third incident surfaces of the third optical lens intersecting with a respective one of the optical axes of the light-emitting chips at a substantially right angle, respectively, and each of the third optical lens enlarging from the third incident surface toward the third light-emitting surface;

a second optical lens having a second lens portion and a second supporter mounted on the mounting surface of the mounting board using the second supporter of the second optical lens, which is formed in a tubular shape and connects to the second lens portion, and the second optical lens covering the plurality of third optical lenses, and the second lens portion of the second optical lens having a second lens incident surface and a second lens light-emitting surface located in an opposite direction of the second lens incident surface, the second lens incident surface of the second lens portion facing each of the third light-emitting surfaces of the third optical lens, and the second light-emitting surface of the second optical lens formed in a convex shape in an opposite direction of each of the third light-emitting surface of the third optical lens and in the aligning direction of the plurality light-emitting chips; and wherein when the plurality of light-emitting chips emits lights, each of linear light distribution patterns formed by the lights is configured to extend in the extending direction of the plurality of light-emitting chips and to gather in the aligning direction of the plurality of light-emitting chips from the second lens light-emitting surface of the second optical lens, respectively, and also is configured to include linear non-lighting-emitting zones between the adjacent linear light distribution patterns in the aligning direction of the plurality of light-emitting chips.

6. The vehicular lamp according to claim 5, further comprising:

a casing having a bottom surface, a top surface and a side surface located between the top surface and the bottom surface, the mounting board mounted on the bottom surface of the casing, a part of the second optical lens, which projects from the second supporter of the second optical lens toward the top surface of the casing, located adjacent the top surface of the casing, and also the second supporter of the second optical lens located adjacent the side surface of the casing.

7. The vehicular lamp according to claim 5, wherein the lights emitted from the plurality of light-emitting chips are a substantially single color light.

8. The vehicular lamp according to claim 5, wherein the lights emitted from the plurality of light-emitting chips are alternately two color lights.

9. The vehicular lamp according to claim 5, wherein each of each of the third light-emitting surfaces of the third optical lens is formed in a concave shape toward the second optical lens in the extending direction of the plurality of light-emitting chips, and the second lens incident surface of the second optical lens include a plurality of convex surfaces, in which each of the plurality of convex surfaces faces a respective one of the convex shapes of the third light-emitting surfaces of the third optical lens.

10. The vehicle lamp according to claim 5, wherein at least one light-emitting device integrates the third optical lens with the light-emitting chip.

11. The vehicle lamp according to claim 5, further comprising:

a first shade mounted on the mounting surface of the mounting board, and located between the adjacent light-emitting chips in the aligning direction of the plurality of light-emitting chips, wherein at least one of the third optical lenses is located between the adjacent first shades.

12. The vehicle lamp according to claim 11, further comprising:

a second shade mounted on the mounting surface of the mounting board, and located between the adjacent light-emitting chips in the aligning direction of the plurality of light-emitting chips, wherein at least one of the third optical lenses is located between the adjacent second shades.

* * * * *